J. B. LEE.
MECHANISM FOR CONVERTING MOTION.
APPLICATION FILED MAR. 21, 1911. RENEWED NOV. 20, 1916.

1,232,055.

Patented July 3, 1917.
4 SHEETS—SHEET 1.

WITNESSES
Eva McCampbell
Wm Whaley

INVENTOR
James B. Lee
By Cyrus Kehr
Attorney

J. B. LEE.
MECHANISM FOR CONVERTING MOTION.
APPLICATION FILED MAR. 21, 1911. RENEWED NOV. 20, 1916.
1,232,055.
Patented July 3, 1917.
4 SHEETS—SHEET 2.
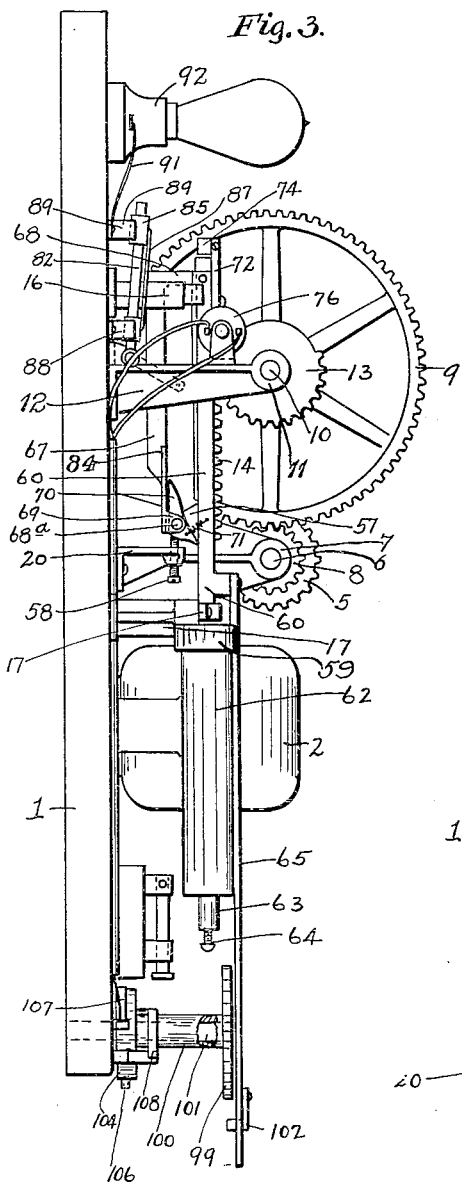
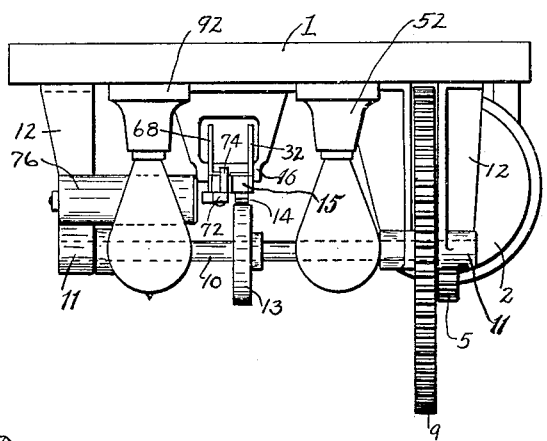
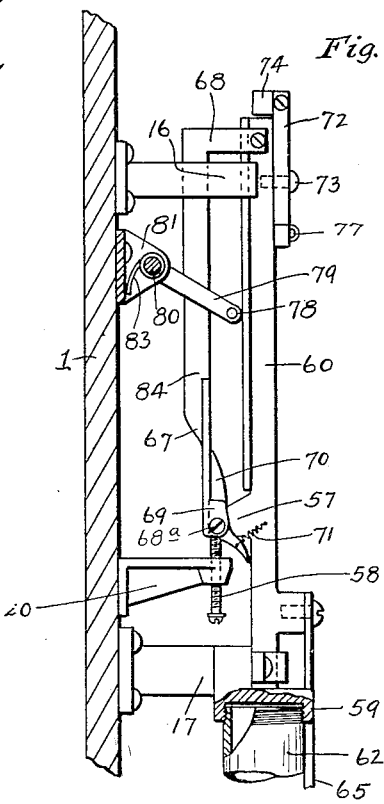
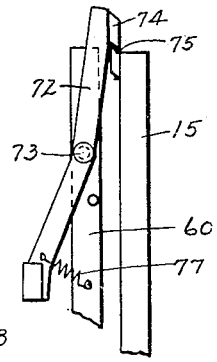
WITNESSES
INVENTOR
James B. Lee
By Cyrus Kehr
Attorney

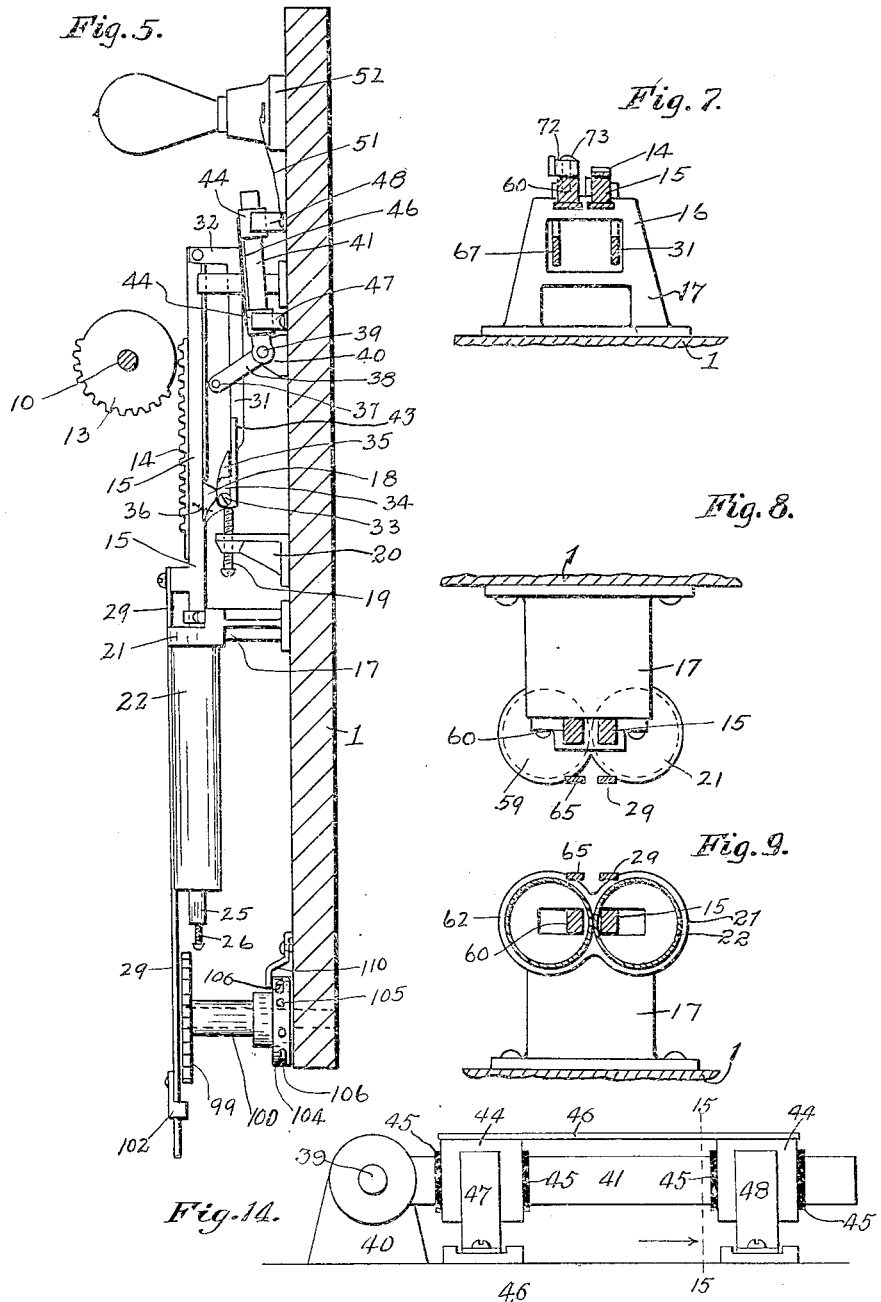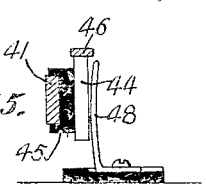

J. B. LEE.
MECHANISM FOR CONVERTING MOTION.
APPLICATION FILED MAR. 21, 1911. RENEWED NOV. 20, 1916.

1,232,055.

Patented July 3, 1917.
4 SHEETS—SHEET 4.

WITNESSES
Eva McCampbell
W. Wholey

INVENTOR
James B. Lee
By Cyrus Kehr
Attorney

UNITED STATES PATENT OFFICE.

JAMES B. LEE, OF SAVANNAH, GEORGIA.

MECHANISM FOR CONVERTING MOTION.

1,232,055.     Specification of Letters Patent.     Patented July 3, 1917.

Application filed March 21, 1911. Serial No. 615,985. Renewed November 20, 1916. Serial No. 132,493.

*To all whom it may concern:*

Be it known that I, JAMES B. LEE, a citizen of the United States, residing at Savannah, in the county of Chatham and State of Georgia, have invented a new and useful Improvement in Mechanism for Converting Motion, of which the following is a specification, reference being had to the accompanying drawing.

My invention relates particularly to mechanism for converting rotary motion into intermittent or irregular reciprocatory motion; but, in a generic sense, the mechanism is applicable for the conversion of rotary motion into other than intermittent or irregular reciprocatory motion. And in a specific sense, the improvement relates to the transmission of rotary motion to two reciprocatory members, one of which is reciprocated during approximately uniform periods, while the other is reciprocated at the same or longer, and if so desired, irregular intervals. The improvement further embodies means for converting such reciprocatory motion into a rocking or oscillating motion.

The object of the invention is to provide motion converting mechanisms suitable for embodiment in various forms of apparatus designed to perform practical work of various kinds. As an illustration of such application of the improvement, the apparatus is herein shown applied for the control of electric light circuits.

In the accompanying drawings,

Fig. 3 is a left hand elevation of the same apparatus;

Fig. 4 is a plan of the same apparatus;

Fig. 5 is a section on the line 5—5 of Fig. 1, looking toward the left;

Fig. 6 is a section on the line 6—6 of Fig. 1, looking toward the right, the electromagnet being omitted;

Fig. 7 is a horizontal section on the line 7—7 of Fig. 1, looking upward, the electromagnet being omitted;

Fig. 8 is a horizontal section on the line 8—8 of Fig. 1, looking downward;

Fig. 9 is a horizontal section on the line 9—9 of Fig. 1, looking upward;

Fig. 10 is a detail elevation of a portion of the mechanism shown by Fig. 6;

Figs. 14 and 15 are details of a switch.

Figure 11:
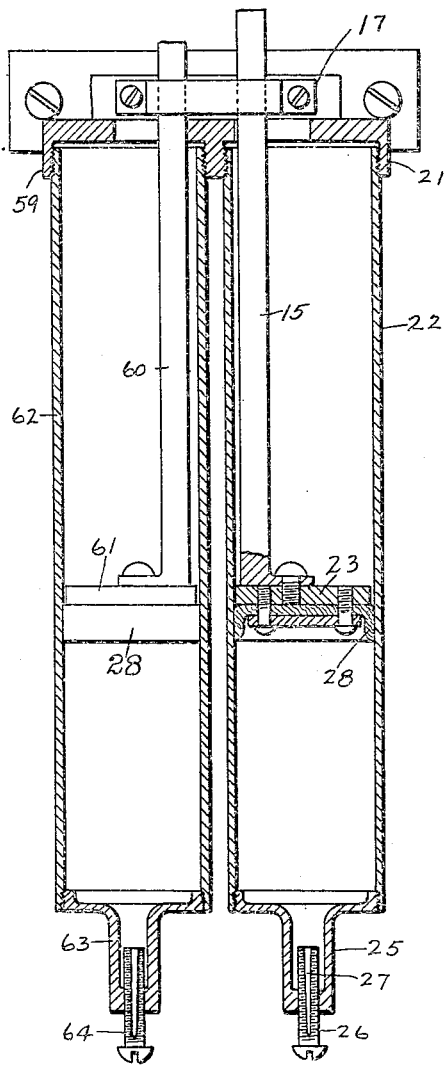
Fig. 11 is a detail sectional view of the pneumatic cushion cylinders.

Referring to said drawings, 1 is an upright base to which the working parts of the apparatus are secured. An electric motor, 2, is secured to said base with its axis upright and having on the upper end of its shaft, 3, a worm gear, 4, meshing with a worm gear wheel, 5, mounted on an axle, 6, fixed horizontally in a bracket or arm, 7. Rigid with the worm wheel is a small spur gear wheel, 8. These two wheels may be made rigid with each other in any manner. The wheel, 8, meshes with the large gear wheel, 9, which is rigid on the horizontal shaft, 10, resting in bearings, 11, on arms or brackets, 12. Rigid on the shaft, 10, is a mutilated spur gear wheel, 13, adapted to mesh with a gear rack, 14, on an upright, primary bar, 15, slidable vertically in an upper support, 16, and a lower support, 17. On the rear of said bar is a lug, 18, (Fig. 5) adapted to bear against an upright screw, 19, standing in the path of said lug and threaded through a bracket, 20. By varying the position of said screw, the downward limit of movement of said bar may be varied. By means of this adjustment, provision may be made for proper meshing of the teeth of the mutilated wheel, 13, with the teeth of the rack. On the support, 17, is a horizontal, interiorly screw-threaded ring, 21, into which extends the exteriorly screw-threaded upper end of an upright, cylindrical, pneumatic dash-pot, 22. The primary bar, 15, extends into said dash-pot and therein supports a piston, 23 (Fig. 11). The lower end of the dash-pot terminates in a tube, 25, into which is threaded a screw, 26, having a longitudinal groove, 27, which is of increasing cross section from the head of the screw to the point thereof. Said groove makes a vent for the lower end of the dash-pot, and by turning said screw up and down in said tube, the cross section of said vent may be varied. Air is the resisting medium in said dash-pot, the piston being preferably air-tight or substantially so during its downward movement, and the air below the piston escaping slowly through said vent. The piston, 23, is preferably formed with a downward-directed peripheral rubber or leather flange, 28, which spreads for air-tight action during downward movement and converges for the passage of air around the piston during upward movement, so that the piston may readily move upward without the creation of a partial vacuum below it and consequent air pressure resistance to upward movement. But, if the apparatus is geared for a sufficiently slow upward movement, provision may be made for only taking the air in through the vent.

Below the gear rack, 14, the upper end of a bar or link, 29, is secured to the front of the primary or main bar, 15; said link 29, extending downward in front of and below the dash-pot, 22.

A weight, W, is suspended from the lower end of said link, in any suitable manner, as by means of a chain, 30. When said main or primary bar, 15, is free from the mutilated gear wheel, 13, said weight draws said bar downward. Said weight is a contantly-acting means tending to move said primary bar in the direction opposite the direction of action of the mutilated gear wheel. The direction of rotation of said mutilated gear wheel is such (clockwise when viewed from the left) as to move the teeth thereof which are adjacent said bar upward. Hence, when said bar is at its lower limit and the clear portion of said wheel is opposite the rack, 14, further rotation of said wheel will bring the teeth thereof into engagement with the uppermost teeth of said rack and cause the lifting of the latter and said bar until all the teeth of said wheel have in turn engaged said rack, and when the last of said teeth disengages itself from said rack, said bar is free to move downward in response to the action of the weight, W. The parts are so proportioned as that the piston, 23, will at such time be in the upper portion of the dash-pot with a relatively large volume of air between the piston and the bottom of said pot forming a relatively weak cushion—so weak that said piston bar and weight may instantly take a rapid movement which is gradually checked by the increasing density and resistance of the air between the piston and the bottom of the dash-pot. The effect of such cushion may be varied by adjustment of the screw, 26, in the tube, 25.

Associated with the main or primary bar, 15, is a rock-shaft having arms for the transmission of rocking or oscillatory motion during the first portion of the downward movement of said bar. Such first portion of the downward movement of said bar being quite rapid, it follows that the reciprocation or oscillation of said rock shaft and the arms thereto attached is rapid. And motion is transmitted from said bar to one of said arms, and the other of said arms is relatively long, so that the movement of its outer end is more rapid than is the movement of the outer end of the first arm. Hence the quick movement transmitted from said bar to the first or relatively short arm is augmented or intensified in the second or relatively long arm.

Figure 1:
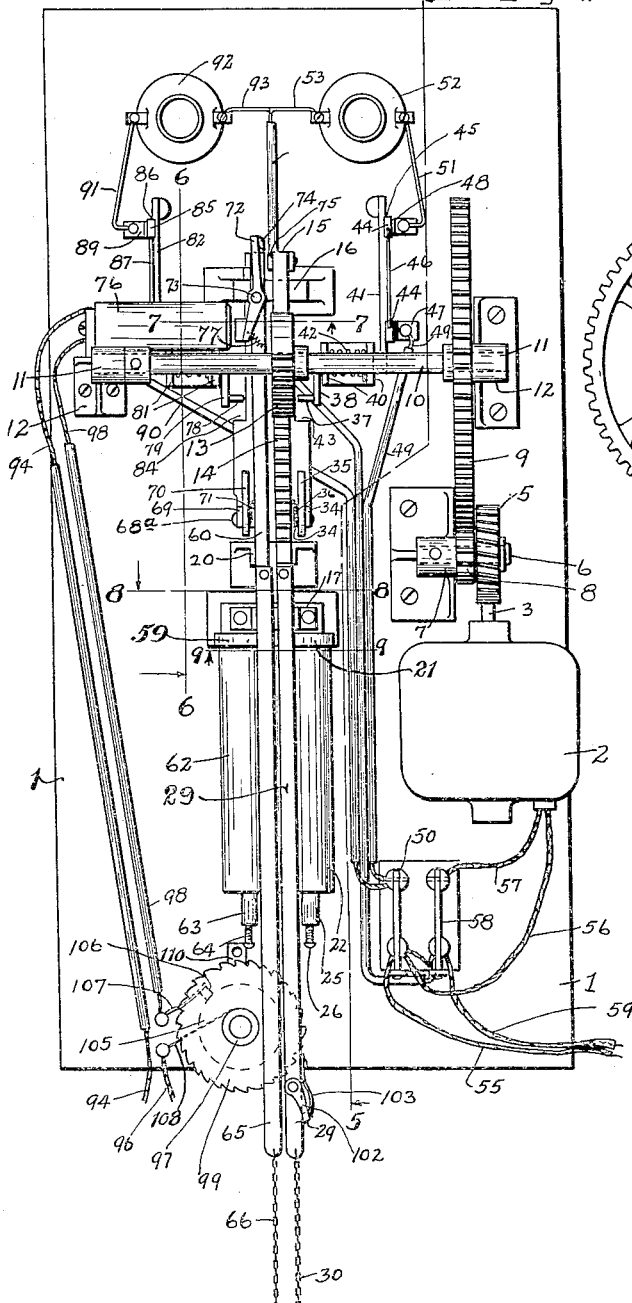
Figure 1 is a front elevation of an apparatus embodying my improvement.
Figure 2:
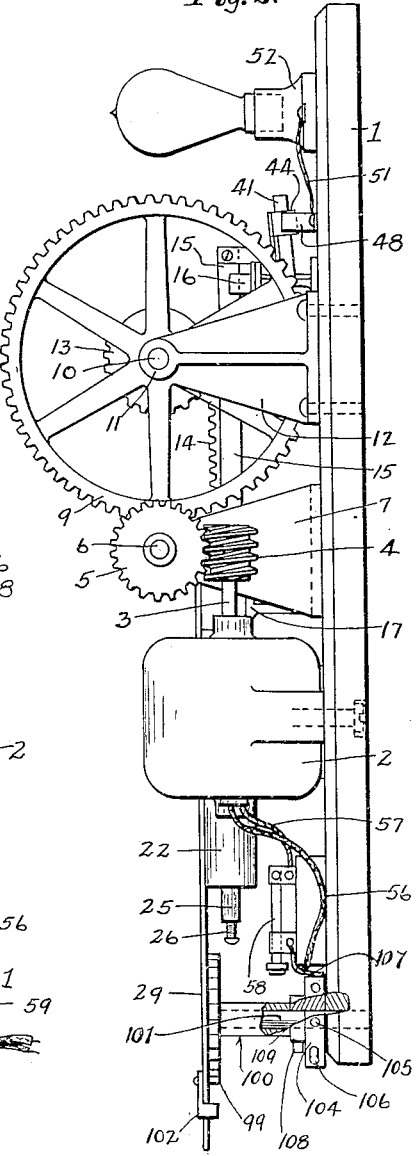
Fig. 2 is a right hand elevation of the same apparatus.
Figure 13:
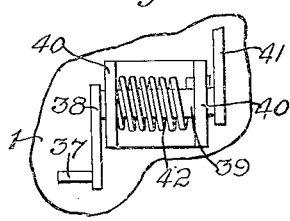
Fig. 13 is a detail of a rock-shaft and associated parts.

Behind the upper part of the main or primary bar, 15, is a bar, 31, having at its upper end a forward-directed arm, 32, fastened to the right hand side of the bar, 15, and having its lower end secured to the right hand side of the lug, 18, by means of a screw, 33, passing through two forward-directed ears, 34, (Figs. 1 and 5) and a tripping member consisting of a bell-crank, 35, the latter being loose upon said screw and having an upper arm normally bearing against the bar, 31, and having a lower arm directed forward and downward, so that downward pressure upon said lower arm will tilt said bell-crank while upward pressure on said arm will cause the upper arm to bear against the bar, 31, and prevent the tilting of said bell-crank. A contracting coiled spring, 36, is applied by one end to the lower arm of the bell-crank and by its other end to the main bar, 15, and normally tilts said bell-crank so as to cause its upper arm to bear against the bar, 31. The reciprocation of the bar, 15, causes the bell-crank to move bodily up and down in a direction parallel to the movement of the bar, 15. In the path of the lower arm of said bell-crank is a horizontal wrist, 37, (Figs. 1, 5 and 13) on a short arm, 38, which is rigid on one end of the horizontal rock-shaft, 39, resting in bearings, 40. On the other end of said rock-shaft is a relatively long rigid arm, 41. Around said rock-shaft is a torsion spring, 42, secured to one of the adjacent bearings and to said shaft in proper relation to tend to turn the front portion of said shaft upward so as to press the arm, 41, rearward toward the base, 1. Said spring is a constantly-acting means tending to turn the rock-shaft in one direction. At a suitable distance above the bell-crank, 35, the bar, 31, has an offset portion, 43, (Figs. 1 and 5). When the main or primary bar, 15, is moved upward, the forward or lower arm of the bell-crank, 35, bears against the wrist, 37, and is pressed downward and rearward until it has passed said wrist, and then immediately, through the action of the spring, 36, assumes its normal position. Then, on the downward movement of the bar, 15, said arm of the bell-crank bears unyieldingly against said wrist and forces the latter downward and rearward, the wrist slipping rearward over the lower edge of said arm and the lower edge of the adjacent ear, 34, and then along the rear face of the bar, 31, until the offset portion, 43, is reached. Then, in response to the action of the torsion spring, 42, the arm, 38, and said wrist are thrown forward so that the rock-shaft and the parts thereto attached are returned to the position of rest. During such rearward and forward movement of said wrist, the relatively long arm, 41, of the rock shaft moves in opposing directions the rock shaft and the parts thereto attached are turned or moved out of the position of rest during the first portion of the downward movement of the bar, 15, for the bell crank, 35, and the adjacent ear, 34, are located at such height upon said bar as to bring the wrist, 37, just below said bell crank and ear when the bar has been raised high enough to permit disengagement of the mutilated gear, 13. (See Fig. 5). Since the bell crank and said ear extend over a length which is only a small fractional portion of the distance of travel by the bar, 15, it follows that the rocking member or rock-shaft is turned out of its position of rest during only a fractional portion of the downward travel of said bar, when the rocking member has in this manner been turned out of the position of rest, it is so held while the portion of the bar, 31, between the lower portion of the ear, 34, and the offset portion, 43, of said bar slides downward over the wrist, 37. Since this occurs while the piston 23, is still in the upper portion of the cylinder, 22, before the air below the piston has become compressed, the bar, 15, quickly falls far enough to free the bar, 31, from said wrist, 37. Hence the rocking member is quickly turned out of the position of rest and is held out of such position only a short time, and since the wrist, 37, is released from the arm, 31, the spring, 42, quickly returns the rocking member into the position of rest. When, as is the case with the apparatus illustrated by the drawings, the rocking member is turned out of the position of rest to open an electric switch, it is important, when a heavy load is carried across said switch, to turn said rotary member out of its position of rest as quickly as possible, in order to avoid harmful flashing or arcing.

Figure 12:
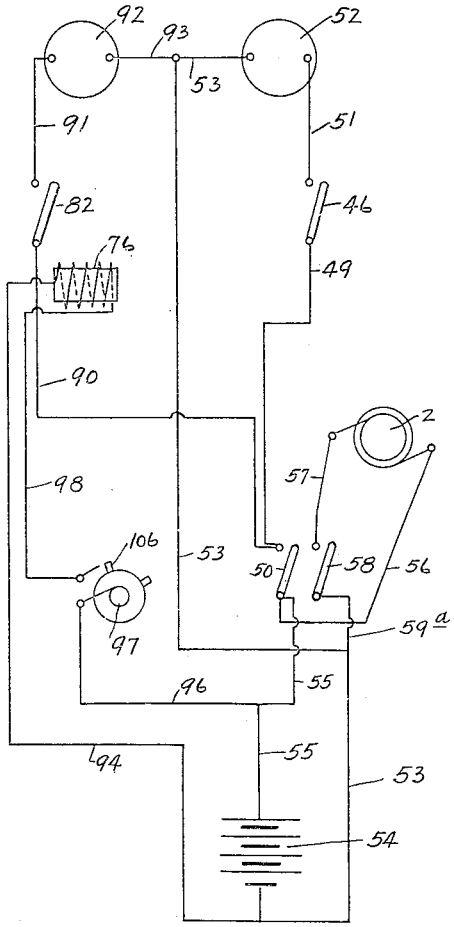
Fig. 12 is a diagrammatic view of electric circuits used in the apparatus.

On the arm, 41, are two metallic contact plates, 44, separated from said arm by insulation pieces, 45, and connected with each other by a conductor, 46. On the base, 1, is a stationary metallic contact plate or finger, 47, insulated from the base (if the latter is not a non-conductor) and adapted to make contact with the lower plate, 44. And above the plate, 47, is a similar plate, 48, adapted to make contact with the upper plate, 44, when the arm, 41, is in its rear position. (Figs. 1, 2, 5, 14 and 15). From the plate, 47, an insulated electric conductor, 49, leads to a switch, 50, and from the plate, 48, a conductor, 51, leads to an incandescent lamp socket, 52. From said lamp socket a conductor, 53, leads to a source of electric current supply, 54, (Figs. 1 and 12). A conductor, 55, leads from the switch, 50, to a source of electric current supply. A conductor, 56, leads from the motor, 2, to the source of electric current supply, 54, via the conductor, 55; and the conductor, 57, leads from the motor to the switch, 58, and from said switch a conductor, 59ª, leads to the other side of the source of supply, 54, via the conductor, 53.

On closing the switch, 58, the motor, 2, is set into action; and on closing the switch, 50, the circuit is closed through the incandescent electric lamp, 52, it being remembered that the rock-shaft arm, 41, bearing the contact plates, 44, 44, is by the spring, 42, normally held in its rearmost position so that said plates bear against the plates, 47 and 48. Thus the lamp, 52, is in operation and so continues until the circuit upon which the lamp is located is broken by the oscillation of the rock shaft, 39, and the movement of the arm, 41, forward away from the base, 1.

Said lamp represents any operating apparatus which is to be periodically put out of operation through my improved mechanism for converting motion. But, to reduce the scope of the mechanism involved, it may be stated that the bringing of the plates, 44, into and out of engagement with the plates, 47 and 48, at approximately regular intervals is the work to be done by my improved motion converting apparatus in the form illustrated by the drawings; but it is to be remembered that such work is merely one example of the application of my improved mechanism to a useful or practical purpose.

For the oscillation of the rock-shaft, 39, and the arms, 38 and 41, to move said contact plates, 44, so that contact is broken between at least the upper plate, 44, and the plate, 47, the primary bar, 15, is drawn upward by the mutilated gear, 13, until the bell-crank, 35, has passed the wrist, 37, on the arm, 38, said wrist remaining stationary and the switch remaining closed. Then the release of the bar, 15, from said mutilated gear allows said bar to move downward and, by means of the bell-crank, 35, and the right hand ear, 34, press said said wrist and the arm, 38, downward and rearward, whereby the rock-shaft, 39, and the long arm, 41, bearing the plates, 44, are correspondingly turned. As soon as the wrist, 37, reaches the offset portion, 43, on the bar, 31, said rock shaft and the arms (and said wrist) supported thereby turn in the reverse direction in response to the strain of the torsion spring, 42, thus again bringing the plates, 44, into contact with the companion plates, 47 and 48. It is to be observed that the rockshaft is a rocking member which is moved out of and returned into its position of rest during a fractional portion of the downward movement of the primary bar, and at other times the rock-shaft is not disturbed, the spring, 42, being a means constantly acting upon said rotary member tending to turn it into its position of rest.

Such oscillation of said rock shaft and its arms is repeated indefinitely as long as the motor, 2, is in operation; and such operation may at any time be suspended by opening the switch, 58. And the operation of the lamp, 52, may be at any time suspended by opening the switch, 50. And during such times as both of said switches are closed, said lamp will be extinguished periodically for a relatively short period, the ratio of the period of illumination being to the period of darkness as the time required for the lifting of the bar, 15, is to the time required for the fall of said bar through a distance equal to the distance from approximately the middle portion of the forward arm of the bell-crank, 35, to the offset portion, 43, of the bar, 31. Inasmuch as the upward movement of said bar is slow and the greater portion of the fall thereof is rapid, it will be seen that the period of illumination is much longer than the period of darkness. In other words, the period of work is longer than the period of interruption. But, it is to be observed, that these two intervals may be reversed, the short intervals being taken for the work and the long interval being taken for the interruption. And the relative lengths of these intervals or periods may be changed.

The apparatus illustrated by the drawings include members for dividing the transmitted motion to perform two separate operations, namely to control the lamp circuit already described and to control another similar lamp circuit, the lamps on the second circuit to be in operation for the same or for longer intervals than the lamps of the first and the intervals of darkness to be simultaneous.

Parallel to and at the side of the primary bar, 15, is a secondary bar, 60, and said bar, 60, is held slidably in the supports, 16 and 17. And the lower end of said bar extends into a dash-pot, 62, and therein supports a piston, 61, corresponding to the piston, 23, in the dash-pot, 22. Said dash-pot, 62, is supported in a ring, 59, the same as the dash-pot, 22, is supported in the ring, 21. The lower end of the dash-pot, 62, has a tube, 63, and in said tube is a channeled vent screw, 64, like the screw, 26, in the tube, 25, of the dash-pot, 22. A link, 65, like the link, 29, is secured to the bar, 60, and a chain, 66, is applied to said link and bears a weight, W. The bar, 60, bears a lug, 57, (like the lug, 18, on the bar, 15) and a screw, 58$^a$, in the bracket, 20, forms an adjustable stop or abutment for said lug.

To the upper portion of said bar, 60, is applied a bar, 67, having at its upper end an arm, 68, and at its lower end a screw, 68$^a$, ears, 69, bell-crank, 70, and contracting coiled spring, 71, respectively like the members, 31 to 36, inclusive, on the bar, 15. But the bar, 60, has no gear rack like the gear rack, 14, on the primary bar. For lifting the secondary bar, it is temporarily engaged with the primary bar by means of a hook lever, 72, pivoted upon the upper end of the secondary bar by a horizontal screw or post, 73, extending loosely through said lever into said bar (Figs. 1, 3, 4, 6, and 10). Said hook lever has a slanting lateral extension, 74, adapted to extend into the path of a block, 75, on the adjacent end of the primary bar. An electro-magnet, 76, (Figs. 1, 3, 4, and 12) is located opposite the lower end of the path of the lower end of said hook lever and the energizing of said magnet tilts said lever so as to bring the lateral extension, 74, into the path of the block, 75, when the primary and secondary bars are in their lowermost positions. The screws, 19 and 58$^a$, are so set as to allow the primary bar to descend slightly after the secondary bar has been stopped, in order that the lateral extension, 74, may be put out of engagement with the block, 75. A contracting coiled spring, 77, is secured by one end to the lower end of said hook lever and by its other end to the secondary bar in such manner as to cause said spring to draw said end of said lever away from the magnet, 76, when the latter is deënergized.

When said magnet is inactive, the primary bar reciprocates entirely independently of the secondary bar, the latter remaining at rest; but as soon as said magnet is energized (while the primary bar is going toward its lower limit), the hook lever is turned by the magnet so as to bring the extension, 74, into the path of the block, 75, (which in passing down pushes said extension aside); and then the next upward movement of the primary bar will cause the simultaneous upward movement of the secondary bar. Adjacent the secondary bar is a wrist, 78, on an arm, 79, which is on a rock-shaft, 80, resting in bearings, 81, and having an arm, 82, and being surrounded by a torsion spring, 83, all corresponding, respectively, to the members, 37 to 42, inclusive, adjacent the primary bar. And the bar, 67, has an offset portion, 84, like the offset portion, 43, on the bar, 31 (Figs. 1, 3, and 6); and the arm, 82, bears contact plates, 85, like the contact plates, 44, on the arm, 41; and the insulation plates, 86, which are like the insulation plates, 45, separate the plates, 85, from the arm, 82; and an electric conductor, 87, connects the plates, 85; and beside the arm, 82, are two plates, 88 and 89, corresponding to the plates, 47 and 48. A conductor, 90, leads from the plate, 88, to the switch, 50, and a conductor, 91, leads from the plate, 89, to an incandescent electric lamp, 92, and a conductor, 93, leads from said lamp to the source of electric current supply, 54, via the conductor, 53. The conductor, 55, already described, leads from said source of supply to the switch, 50.

For the energizing of the electro-magnet, 76, an electric conductor, 94, is shown leading from said magnet to the source of electric current supply, 54, while another electric conductor, 96, leads from said source of supply via the conductor, 55, to a circuit-closing mechanism, 97, and another conductor, 98, leads from the circuit-closing mechanism, 97, to the magnet, 76. The said circuit-closing mechanism should be suitably synchronized with the movements of the primary bar. One manner of accomplishing that result is shown by the drawings, that manner involving a connection with the link 29, for the operating of said circuit-closing mechanism. Behind the lower portion of said link is a ratchet disk, 99, mounted on an insulation sleeve, 100, which loosely surrounds a horizontal, rigid shaft, 101, projecting forward from the base, 1. On the front side of the link, 29, is a downward-directed pawl, 102, arranged for engagement with the teeth of the ratchet disk, 99. A spring, 103, presses said pawl toward said disk. The parts are so proportioned as to cause the pawl to engage one of said teeth during the downward movement of the link and thereby turn said disk through the radial distance between two teeth. During the upward movement of said link, said pawl slips over the next succeeding tooth. Rearward of the ratchet disk a wheel, 104, rigidly surrounds the insulation sleeve, 100, and is provided in its periphery with sockets, 105, each adapted to receive a tooth, 106, which, during the rotation of the wheel, 104, describe a path into which a flexible electrode or brush, 107, extends. Adjacent said brush is another electrode or brush, 108, which makes contact with the hub, 109, of the wheel, 104.

The sockets, 105, should correspond in number with the teeth of the disk, 99; and the teeth, 106, are placed into the sockets according to the desired intervals of operation of the secondary bar, the smallest number of such operations being once during each rotation of the ratchet disk, 99, and the largest number of such operations being the number of sockets, 105, in said wheel.

To prevent idle movement of the ratchet disk, 99, and the wheel, 104, a yielding brake member, 110, (Figs. 1 and 5) is suitably supported to bear upon the disk.

For convenience in description, the position into which the primary bar moves when the mutilated gear frees itself from said bar may be regarded as the position of rest for that bar; and the corresponding position of the secondary bar may be regarded as the position of rest for that bar.

The pneumatic dash-pots, 22 and 62, constitute pneumatic cushions for restraining the downward movement of the primary and secondary bars. And the wheel, 104, constitutes a variable or adjustable member for controlling the means used for temporarily connecting the secondary bar to the primary bar, the variation or adjustment being effected by placing more or fewer teeth, 106, into the sockets, 105, of said wheel.

I claim as my invention:

1. The combination of a rocking member, a reciprocatory bar in operative relation with said rocking member for turning the latter from its position of rest when said bar moves toward its position of rest, means constantly acting upon said rocking member tending to turn it into its position of rest, means constantly acting upon said bar tending to move it to its position of rest, a motor, and gearing intervening between said motor and said bar for periodically moving the latter from its position of rest, substantially as described.

2. The combination of a rocking member, a reciprocatory bar in operative relation with said rocking member for turning the latter from its position of rest when said bar moves toward its position of rest, means constantly acting upon said rocking member tending to turn it into its position of rest, means constantly acting upon said bar tending to move it to its position of rest, a motor, and gearing intervening between said motor and said bar for periodically moving the latter from its position of rest and disengaging from said bar at the termination of such movement, substantially as described.

3. The combination of a rocking member, a reciprocatory bar in operative relation with said rocking member for turning the latter from its position of rest when said bar moves toward its position of rest, a pneumatic cushion for regulating said movement of said bar, means constantly acting upon said rocking member tending to turn it into its position of rest, means constantly acting upon said bar tending to move it to its position of rest, a motor, and gearing intervening between said motor and said bar for periodically moving the latter from its position of rest, substantially as described.

4. The combination of a rocking member, a reciprocatory bar in operative relation with said rocking member for turning the latter from its position of rest when said bar moves toward its position of rest, means constantly acting upon said rocking member tending to turn it into its position of rest, means constantly acting upon said bar tending to move it into its position of rest, an adjustable stop for varying the position of rest of said bar, a motor, and gearing intervening between said motor and said bar for periodically moving the latter away from its position of rest, substantially as described.

5. The combination of a rocking member, a reciprocatory bar in operative relation with said rocking member for turning the latter from its position of rest when said bar moves toward its position of rest, means constantly acting upon said rocking member tending to turn it into its position of rest, means constantly acting upon said bar tending to move it into its position of rest, a motor, and mutilated gearing intervening between said motor and said bar for periodically moving the latter from its position of rest, substantially as described.

6. The combination of a reciprocatory bar, means acting upon said bar tending to move it into its position of rest, a motor, gearing intervening between said motor and said bar for periodically moving the latter from its position of rest, a rocking member in operative relation with said bar to receive motion in one direction from said bar when the latter moves toward its position of rest, and other means for giving motion to said rocking member in the other direction when said rocking member is released from said bar, substantially as described.

7. The combination of a reciprocatory bar, means acting upon said bar tending to move it into its position of rest, a motor, gearing intervening between said motor and said bar for periodically moving the latter from its position of rest, a rocking member in operative relation with said bar to receive motion therefrom during the first portion of the movement of said bar toward its position of rest, and means for moving said rocking member contrary to the movement received from said bar, substantially as described.

8. The combination of a reciprocatory bar, means acting upon said bar tending to move it into its position of rest, a motor, gearing intervening between said motor and said bar for periodically moving the latter from its position of rest, a rocking member arranged to receive motion in one direction from said bar during the first part of the movement of said bar toward its position of rest, and means for returning said rocking-member to its position of rest after its release from said bar, substantially as described.

9. The combination of a reciprocatory bar, means acting upon said bar tending to move it into its position of rest, a motor, gearing intervening between said motor and said bar for periodically moving the latter from its position of rest, a rocking-member arranged to receive motion in one direction from said bar during the first part of the movement of said bar toward its position of rest, means for returning said rocking-member to its position of rest after its release from said bar, and a pneumatic cushion for said bar, substantially as described.

10. The combination of a reciprocatory bar, means acting upon said bar tending to move it into its position of rest, means for periodically moving said bar from its position of rest, a tripping member on said bar, a rocking member having an arm extending into the path of said tripping member, and constantly-acting means tending to turn said rocking member in one direction, substantially as described.

11. The combination of a primary bar and a secondary bar located near and parallel to each other for endwise reciprocation, means acting upon said primary bar tending to move it endwise from its position of rest, means acting upon the secondary bar tending to move it endwise from its position of rest, automatic means for periodically moving the primary bar from its position of rest, means for forming engagement between said bars during the movement of the primary bar from its position of rest, an electro-magnet for controlling said engaging means, and automatic means in operative relation with said primary bar for periodically energizing said magnet, whereby at chosen times the secondary bar is moved from its position of rest by the primary bar in unison with the latter, substantially as described.

12. The combination of a primary bar and a secondary bar located near and parallel to each other for endwise reciprocation, means acting upon said primary bar tending to move it endwise into its position of rest, means acting upon the secondary bar tending to move it endwise into its position of rest, automatic means for periodically moving the primary bar from its position of rest, means for forming engagement between said bars during the movement of the primary bar from its position of rest, an electro-magnet for controlling said engaging means, and automatic ratchet mechanism in operative relation with said primary bar for periodically energizing said magnet, whereby at chosen times the secondary bar is moved from its position of rest by the primary bar in unison with the latter, substantially as described.

13. The combination of a primary bar and a secondary bar located near and parallel to each other for endwise reciprocation, means acting upon said primary bar tending to move it endwise into its position of rest, automatic means for periodically moving said bar from its position of rest, a member hinged upon one of said bars and adapted to extend into the path of the other of said bars, and means comprising an electro-magnet and controlled by the primary bar for periodically turning said member, whereby at chosen times the secondary bar is moved from its position of rest by the primary bar in unison with the latter, substantially as described.

14. The combination of a primary bar and a secondary bar located near and parallel to each other for endwise reciprocation, means acting upon said primary bar tending to move it endwise into its position of rest, automatic means for periodically moving said bar from its position of rest, a member hinged upon one of said bars and adapted to extend into the path of the other of said bars, means comprising ratchet mechanism controlled by the primary bar for periodically turning said member, whereby at chosen times the secondary bar is moved from its position of rest by the primary bar in unison with the latter, substantially as described.

15. The combination of a primary bar and a secondary bar located near and parallel to each other for endwise reciprocation, means acting upon said primary bar tending to move it endwise into its position of rest, automatic means for periodically moving said bar from its position of rest, a member hinged upon one of said bars and adapted to extend into the path of the other of said bars, a magnet for periodically turning said member, and ratchet mechanism controlled by said primary bar for controlling said magnet, whereby at chosen times the secondary bar is moved from its position of rest by the primary bar in unison with the latter, substantially as described.

In testimony whereof I have signed my name, in presence of two witnesses, this 6th day of March, in the year one thousand nine hundred and eleven.

JAMES B. LEE.

Witnesses:
CYRUS KEHR,
W. W. LEE.